Oct. 5, 1937.   H. E. N. PRUVOT   2,094,930
LUBRICATING DEVICE
Original Filed July 14, 1933

H. E. N. Pruvot
INVENTOR

By Marks & Clerk
Attys.

Patented Oct. 5, 1937

2,094,930

UNITED STATES PATENT OFFICE 2,094,930

LUBRICATING DEVICE

Henri Eloi Norbert Pruvot, Sotteville-les-Rouen, France, assignor to C. C. Wakefield & Company Limited, London, England Original application July 14, 1933, Serial No. 680,482. Divided and this application March 24, 1934, Serial No. 717,261. In France July 18, 1932

1 Claim. (Cl. 184—24)

The present invention has for its object a device for the lubrication of connecting rods or similar parts of machines and is a division of my copending application Ser. No. 680,482, filed July 14, 1933.

This present device is characterized by the fact that it comprises the combination of a lubricator body having a chamber forming a reserve of oil, of a discharge nozzle which can, in certain cases, be combined with a valve, and of means controlled by the displacement of the part to be lubricated for periodically putting the oil inlet and the reserve of oil in communication with the nozzle, means being provided for supplying oil under pressure to the lubricator body.

The invention also relates to the following points applied separately or according to any combinations:

(a) A calibrated piston is movable in the reserve of oil for allowing accumulation of oil under pressure in this reserve of oil.

(b) A slide valve controls the communication between the reserve of oil and the nozzle.

(c) A slide valve is moved by a bell crank lever actuated by the member in motion.

(d) A slide valve is moved by the part to be lubricated, through the medium of a movement amplifying device, such as a pawl and ratchet device or the like, for ensuring periodical lubrication for a definite number of displacements of the part to be lubricated.

(e) The part to be lubricated is provided with a bowl receiving the injection when this bowl passes under the injection nozzle.

The device illustrated by way of example only is used in case the bearing to be lubricated participates in a reciprocating rectilinear movement in an approximately horizontal plane (such as the small end of a connecting rod of a locomotive for instance).

The device employed is based on the following principle: the connection between the tube supplying oil under pressure and the part to be lubricated is done away with. The oil passes freely from one to the other at one of the dead centers of the stroke.

Figure 1:
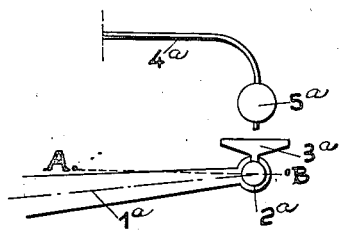
Fig. 1 is a diagrammatic elevation of an improved lubricating device according to the invention as applied to the small end of a connecting rod of a locomotive.

Synchronism is obtained as follows: Fig. 1 is a diagram showing the application to a gudgeon pin of the small end of a connecting rod of a locomotive, $1^a$ is the connecting rod, $2^a$ is the gudgeon pin of the small end of the connecting rod, $3^a$ an oil cup which follows the gudgeon pin $2^a$ in its rectilinear reciprocating movement. A and B designate the dead centers of the stroke. $4^a$ is the piping supplying oil coming from a mechanical lubricator (not shown), $5^a$ is the apparatus for synchronizing the output. The function of this apparatus is to allow oil to flow only when $3^a$, and consequently $2^a$, pass under said apparatus.

Figure 2:
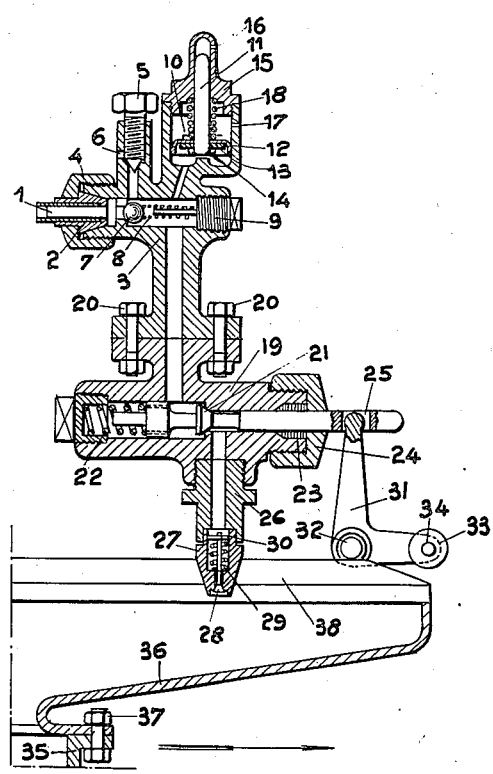
Fig. 2 is an axial sectional elevation of the lubricating device the general assemblage of which is shown in Fig. 1.

Fig. 2 shows the detailed construction of the apparatus $5^a$. The oil is admitted through the pipe 1, which carries a cone 2 pressed, by a nut 4, on a body 3. This body carries a test screw 5, which, when it is loosened, allows oil to flow through the hole 6. The body is perforated with a channel containing a check valve constituted by a ball 7 pressed by the spring 8 held by the screw-threaded ring 9. The body 3 also carries a cylinder 10 in communication with the bore of the body, on the down side of the check valve 7. In this cylinder 10 is arranged a piston 11 terminated by a cup leather 12 clamped by a washer 13 and a nut 14. A cover 15 closes 10 and guides 11. It is perforated at 16 for avoiding any back pressure above 11, and at 17 for avoiding back pressure above the cup leather 12 of the piston. A spring 18, giving a pressure of about 20 kilograms per square centimeter, bears on 11 and 15.

A second body 19 is secured on body 3 by bolts 20. It encloses a valve 21 provided with a guide head which is perforated for allowing the passage of the lubricant. This valve rod extends outside the body 19 by passing through a plastic packing 23 held by a nut 24. Finally, the valve rod is provided, at its free end, with a mortise 25.

On the body 19 is secured, by screwing, a tube 26 the axial channel of which opens in 19 on the outlet side of the valve 21. The member 27 is screwed in the member 26.

The member 27 carries, at its lower part, a small valve 28 pressed upon its seat by a spring 29 giving a pressure of 2 kilograms per square centimeter. The valve 28 can, in certain cases, be dispensed with. This spring 29 presses, on the other hand, on a shoulder of the member 27, and, on the other hand, on a washer 30 screwed and riveted at the end of the valve 28, which therefore can open only downwardly and constitutes a check valve preventing the oil conduits from being emptied, so that when the engine is at rest, the lubricator does not supply oil.

In the mortise 25 of the valve 21 extends the end of a bell crank lever 31 capable of rocking about a stud 32 secured to the member which serves as mechanical support for the bodies 3 and 19. The other end of the lever 31 carries a roller 33 movable about a stud 34. This roller is made of metal or of vulcanized fibre.

The lubricating cup 35 which usually (in particular on locomotives) moves with the pin of the small end of the connecting rod, without being subjected to any movement of rotation, is covered with a member 36 which forms a funnel of rectilinear cross section of small width, about three centimeters, and of about twenty centimeters in length. The member 36 is secured on 35 by bolts 37.

The upper longitudinal edges of the member 36 receive a member 38 acting as a cam on the roller 33 for displacing the same and thereby ensuring the operation of slide of valve 21.

The operation of the entire device is as follows:
The oil, admitted through 1, lifts the ball 7 from its seat and passes to the cylinder 10, forcing the piston 11 upwardly to enable the cylinder to take care of the volume supplied by the conventional oil pump (not shown). The oil cannot return through the conduit 1, as it is prevented from doing so by the ball 7. It is therefore maintained under pressure in the accumulator 10. When the cup 35, carrying the members 36 and 38 comes near the dead center, B moving in the direction of the arrow, the cam 38 lifts the roller 33 and causes the member 31 to rotate about the stud 32 and the valve 21 opens. The oil under pressure at 10 then passes in the conduits provided in 3, 19, 26, and 27 and opens the valve 28. The oil is projected into 36, passes into 35, from which it proceeds to the point to be lubricated.

Then, the dead center being reached, 38 moves back, 21 closes and atmospheric pressure is reestablished above 28 which closes and thus prevents emptying of the whole device by gravity.

Lubrication by projection is therefore effected at each end of one of the strokes of the small end of the connecting rod, with a quantity of oil determined by adjustment of the output of the fixed mechanical lubricator feeding the apparatus above described. In other words, by using a conventional pump of the type in which the compressor piston does not perform its complete stroke at one and the same time, but several times according to a predetermined adjustment, each charge of oil accumulated in the cylinder 10 is fed thereto from the source of supply in several impulses, the number of said impulses being determined by the rate of discharge of the charge from the cylinder 10.

What I claim as my invention and desire to secure by Letters Patent is:

In a device for lubricating a movable member from a fixed source of supply of lubricant, a body member having a cylinder, a conduit allowing said source of supply of lubricant to be placed in communication with the cylinder, a valve in said conduit permitting the admission of said lubricant to the cylinder but preventing the return of the lubricant to said source, a spring actuated piston in the cylinder, an injection nozzle permitting the lubricant to be fed to said movable member, a second conduit placing the cylinder in communication with the nozzle, a sliding valve member in said second conduit normally closing the latter to the passage of lubricant therethrough and adapted to be displaced by said movable member for momentarily establishing communication between the cylinder and the nozzle, whereby the accumulation of said lubricant in said cylinder is suddenly projected by said spring actuated piston through said nozzle to the member to be lubricated.

HENRI ELOI NORBERT PRUVOT.